(12) United States Patent
Gibbs

(10) Patent No.: US 6,973,386 B2
(45) Date of Patent: Dec. 6, 2005

(54) ELECTRONIC MAP DISPLAY DECLUTTER

(75) Inventor: Michael J. Gibbs, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/325,185

(22) Filed: Dec. 20, 2002

(65) Prior Publication Data

US 2004/0122589 A1  Jun. 24, 2004

(51) Int. Cl.$^7$ .......................... G01C 21/00; G06G 7/78; G08G 1/123

(52) U.S. Cl. .................. 701/208; 701/211; 701/212; 340/995.1; 340/995.14; 340/995.24; 340/995.27

(58) Field of Search .................. 701/205, 211, 212; 340/995.1, 995.14, 995.15, 995.24, 995.27

(56) References Cited

U.S. PATENT DOCUMENTS

| | | | | |
|---|---|---|---|---|
| 4,896,154 A | * | 1/1990 | Factor et al. | 340/995.27 |
| 6,163,749 A | * | 12/2000 | McDonough et al. | 701/208 |
| 6,587,787 B1 | * | 7/2003 | Yokota | 701/212 |

\* cited by examiner

Primary Examiner—Thomas G. Black
Assistant Examiner—Brian J. Broadhead

(57) ABSTRACT

Method, apparatus and program product are provided for controlling the number of symbols presented on an vehicle electronic map display by using a first threshold constant for the number of symbols to be presented in FULL detail and a second threshold constant for the number of symbols to be presented in MINIMUM detail. In a first embodiment, the total number of selected symbols is compared to the threshold constants for each symbol type. In a second embodiment, the number of symbols of each type is compared to the respective threshold constants for each type. Excessive map clutter is avoided without regard to the map range selected by the user and for both high density and sparse map regions.

20 Claims, 8 Drawing Sheets

ELECTRONIC MAP DISPLAY DECLUTTER

FIELD OF THE INVENTION

The present invention generally relates to an improved means and method for controlling the amount of data presented on an electronically generated map, and more particularly to decluttering electronic map displays used in aircraft and other vehicles.

BACKGROUND OF THE INVENTION

The present invention is described by way of example for electronic map displays in aircraft, but those of skill in the art will understand that this is merely for convenience of explanation and is not intended to be limiting and that the present invention applies to electronic map displays of all kinds whether static map displays or moving map displays. As used herein, the word "aircraft" is intended to include all types of vehicles whether in air, at sea or on land and that the invention also applies to static applications where the map display is fixed in space and to moving map displays where the electronically generated map appears to move with respect to the map observer.

Moving map displays have become standard equipment on modern aircraft flight decks. The map display presents a "God's Eye" view of the territory over which the aircraft is passing. Often the present position of the aircraft is identified by a dot or other symbol located about in the center to lower half of the display. In the usual installation, as the aircraft moves, the aircraft symbol remains stationary with respect to the display while the chart shown on the display appears to slide from top to bottom past the observer, hence the description as a "moving map" display. However the converse arrangement can also be used where the map display is paged and the aircraft position moves while the map page being displayed remains stationary. Either arrangement is useful. The technologies for generating such map displays and locating the aircraft position with respect to the map coordinates are well known in the art.

The newest aircraft map displays emulate the appearance of aviation charts on which avionics-generated symbols are overlaid. The various symbols that are overlaid on the map may represent the location of airports, navigation aids and other features important for safe aircraft operation. Examples of various symbols and their acronyms as used herein are: (i) VOR=VHF Omni-directional Range beacon, (ii) LVOR=Low altitude VOR beacon, (iii) HVOR=High altitude VOR beacon, (iv) NBD=Non-Directional Beacon, (v) APT=Airport, (vi) ILS=Instrument Landing System, and so forth. Other features may be used in applications with sea or land vehicles.

An electronic map display is not the same as a paper chart. Electronic map display screens, especially those used in aircraft may be only 10–30 cm across and do not have the size or resolution of most paper charts. Therefore compromises are needed to portray the same symbology effectively. The visual fidelity required to do this places severe demands on the electronic map display's ability to manage the total amount of information shown at any given time, that is, the map "clutter." "Clutter" refers to the visual impact of having a large number of symbols overlaid on the chart. When too many symbols are presented at the same time their individual significance is lost. Under these circumstances, the electronic map display is so "cluttered" that it becomes much less effective. This is illustrated in FIGS. 1A–1B where border 10 encloses aircraft map display 12. Shapes 14 schematically represent various symbols (e.g., VOR, NDB, APT, ILS, etc.) being overlaid on the map. Symbols 14 may have text associated therewith or be distinctive in size, shape and/or color so as to identify the type of symbol presented. FIG. 1A shows schematically the density of symbols 14 that might be encountered in a high symbol density area at a 20 nautical-mile (NM) range setting. The range setting is the map distance from top 16 to bottom 18 of display 12. FIG. 1B shows the same display with a 200 NM range setting. In FIG. 1B the much larger number of symbols 14 located within the larger range causes the "clutter" to be so severe that the individual symbols lose much of their meaning or are hard to distinguish individually. Thus, one of the biggest problems on the limited display area available for electronic map displays is how to declutter the display when there are a lot of important features (symbols) to be shown, in a manner that insures that the most important information is still being presented.

The prior art method of decluttering map symbology is to show, hide, or simplify various symbols at different map range settings. For example, all the low altitude VOR (LVOR) station symbols might be shown at <80 nautical mile (NM) range and hidden above that range, while high-altitude stations (HVOR) may be shown up to 320 NM range. This method is moderately effective, but requires the designer to specify range/symbol thresholds based on average or worst-case symbol densities that the aircraft might encounter. These preset thresholds are not necessarily appropriate in different areas of the world. It might be necessary, for example, to limit the full display of NDB symbols in the New York or Los Angeles terminal areas to a relatively small range. Conversely an area of Montana might support a much larger range without making the display seem too crowded but the display is under-utilized because of the range-based thresholds. This is illustrated in FIGS. 2A–B analogous to FIGS. 1A–B, but using prior art decluttering. FIG. 2A shows a 200 NM range-based decluttered display of a high symbol density area and FIG. 2B shows the same prior art decluttered display in a low-density area at the same range. Small dots 20 on FIGS. 2A–B represent symbols that are available but not presented so as to avoid excess clutter and symbols 14 have the same meaning as explained in connection with FIGS. 1A–B.

For example, FIG. 2A shows a prior art decluttered display in a high-density area at a range setting of 200 NM. Only those symbol types that are below their respective range based threshold would be displayed as symbols 14, the rest being omitted or shown merely as dots 20. With the prior art, the same range-based threshold also applies in a low-density area (FIG. 2B) where there are many fewer symbols of each type. Thus, only two symbols might be presented of the types below their range-based threshold while all the others available in this area would be omitted or represented by dots 20 for which no on-screen information is given. In this case, two symbols are well below the useful capability of the display and the information level that can be handled by the viewer. Thus, the prior art approach does not provide the optimal symbol density in many geographical areas. With the advent of more interactive map displays, particularly those incorporating graphical flight planning, having more of the useful symbology on-screen at the same time is increasingly important.

Accordingly, it is desirable to have a means and method for decluttering map displays that are adaptive, that is, that: (i) takes into account the number of different symbols actually present in the current map area and not merely the range setting of the display, and (ii) that are able to provide substantially constant symbol density irrespective of the range settings. In addition, it is desirable to provide a means and method by which the map display user can prioritize the presentation of different types of symbols, that is, be able to establish a hierarchy of different types of symbols to be presented according to a defined priority regime. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A program method is provided for controlling the number of symbols of types $(XYZ)_i$ rendered on a map display, where i runs from 1 to N and N is the total number of selected symbol types, comprising: (a) determining the total number of symbols $S_T' = SUM\{S_{(XYZ)i}\}$ for i=1 to N, where $\{S_{(XYZ)i}\}$ is the number of symbols of type $(XYZ)_i$, and then first for i=1; (b) rendering FULL information for symbol type $(XYZ)_i$ on the map display and delivering $S_T = S_T'$ to step (e) if $S_T < S_i(F)_{XYZ}$ is TRUE, where $S_i(F)_{XYZ}$ is a first threshold constant for symbol type $(XYZ)_i$, or if $S_T < S_i(F)_{XYZ}$ is FALSE; (c) rendering MINIMUM information for symbol type $(XYZ)_i$ on the map display and delivering $S_T = S_T'$ to step (e) if $S_T < S_i(M)_{XYZ}$ is TRUE, where $S_i(M)_{XYZ}$ is a second threshold constant for symbol type $(XYZ)_i$, or if $S_i(M)_{XYZ}$ is FALSE; (d) delivering $S_T = S_T' - S_{i(XYZ)i}$ to step (e), where $S_{i(XYZ)i}$ is the number of available symbols of type $(XYZ)_i$; and (e) repeating steps (b)–(d) for i=2 to N, thereby populating the map display with a controlled number of symbols.

In a further embodiment there is provided a program method for controlling the number of symbols of types $(XYZ)_i$ rendered on a map display, where i runs from 1 to N and N is the total number of selected symbol types, comprising, starting first with i=1, (a) setting $S_{T\,i} = S_{(XYZ)i}$, where $S_{(XYZ)i}$ is the number of available symbols of type $(XYZ)_i$; (b) rendering FULL information for symbol type $(XYZ)_i$ on the map display if $S_{T\,i} < S_i(F)_{XYZ}$ is TRUE, where $S_i(F)_{XYZ}$ is a first threshold constant for symbol type $(XYZ)_i$, or if $S_{T\,i} < S_i(F)_{XYZ}$ is FALSE; (c) rendering MINIMUM information for symbol type $(XYZ)_i$ on the map display if $S_{T\,i} < S_i(M)_{XYZ}$ is TRUE, where $S_i(M)_{XYZ}$ is a second threshold constant for symbol type $(XYZ)_i$, or if $S_{T\,i} < S_i(M)_{XYZ}$ is FALSE rendering none of symbols of type $(XYZ)_i$ on the map display; and (d) repeating steps (a)–(c) for i=2 to N, thereby populating the map display with a controlled number of symbols.

There is further provided an apparatus for operation of a map display on which various symbols are rendered in controlled number, comprising: a processor; a memory coupled to the processor; a display unit coupled to the processor and memory for displaying the map, an aircraft location on the map and the various symbols; and a program residing in memory and being executed by the processor for rendering on the map display a controlled number of the symbols, the program comprising, in a first embodiment, the program method recited first above and, in a second embodiment, the program method recited second above.

There is further provided a program product comprising: in a first embodiment, the program method recited first above and, in a second embodiment, the program method recited second above; and a signal bearing media bearing said program method.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1A:
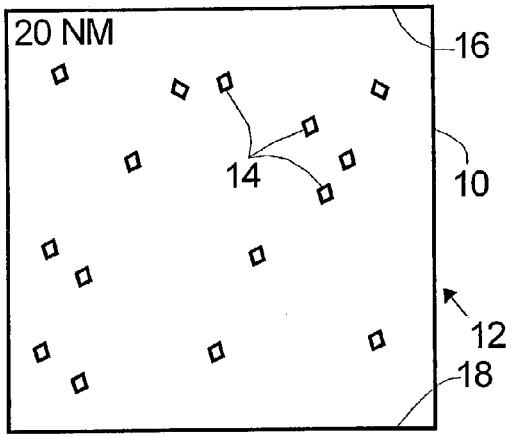
FIGS. 1A–B are schematic representations of aircraft map displays for different range settings, according to the prior art.
Figure 1B:
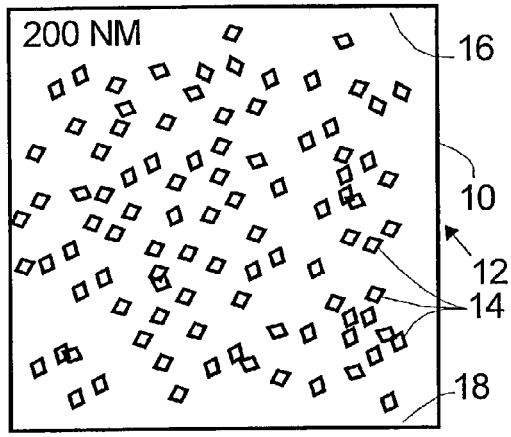
Figure 2A:
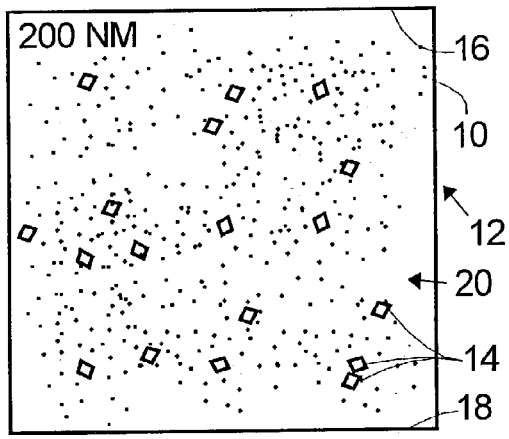
FIGS. 2A–B are schematic representations of aircraft map displays similar to FIGS. 1A–B, but at the same range settings and in different regions of the country, using range based decluttering according to the prior art.
Figure 2B:
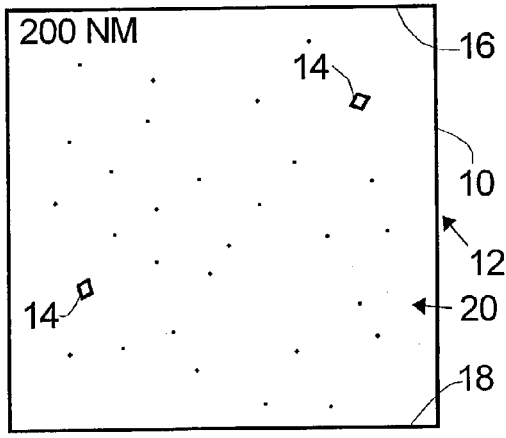
Figure 3A:
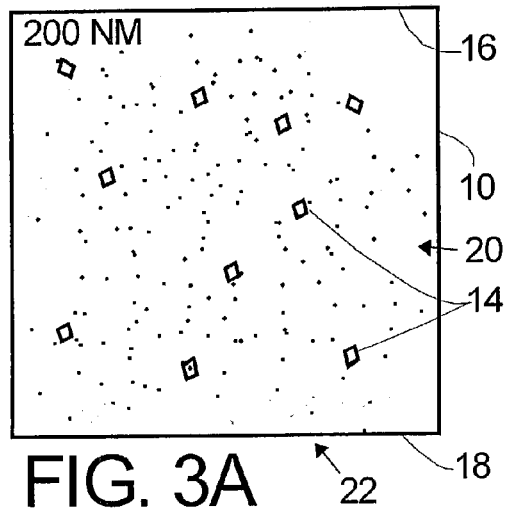
FIGS. 3A–B are schematic representations of aircraft map displays similar to FIGS. 2A–B at the same ranges settings and in different regions of the country, but using decluttering according to the present invention.
Figure 3B:
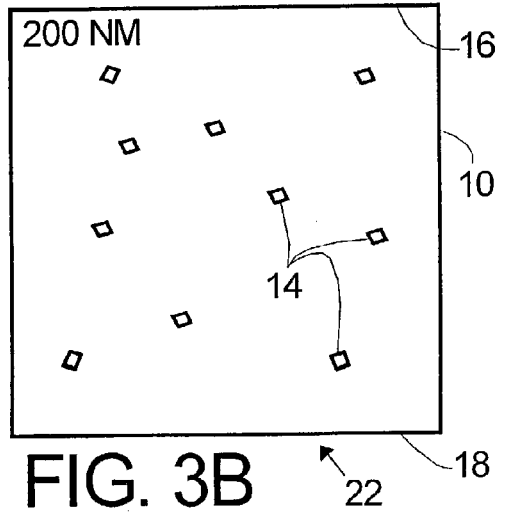

The present invention provides an improved declutter means and method which takes into account the total density of symbols on the display and/or the total density of each type of symbol, rather than merely the map range setting. It provides adaptive decluttering that keeps display clutter manageable in high-density areas without penalizing those operating in lower-density areas. It can maintain a relatively constant level of clutter regardless of display range settings or location. This is illustrated in FIGS. 3A–B, analogous to FIGS. 2A–B, but according to the present invention, where FIG. 3A shows map display 22 for a high density area at a high range setting, e.g., 200 NM, and FIG. 3B shows a similar display for a low density area at the same range setting. As before, small dots 20 in FIG. 3A represent available symbols that are not presented in order to avoid excessive clutter and symbols 14 identify various navigation aids or other important features about which information is overlaid on the map display. It will be noted that the numbers of symbols 14 presented on displays 22 in FIGS. 3A–B are about the same even though the total number of available symbols is vastly different.

The present invention takes advantage of the fact that map displays typically identify the set of symbols to be displayed prior to actually rendering them on the display screen. For example, before the VOR symbols are drawn, the set of VORs that will be visible within the selected map range and from the current map reference point (e.g., aircraft location) is determined from map and feature information stored in the aircraft avionics or flight management system and an accurate VOR count is known. Thus, the total numbers of available symbol features of each type that are present within the map area for the range setting being used are known before the symbols need to be presented on the map display. This information is used to provide an adaptive decluttering means and method.

Figure 4:
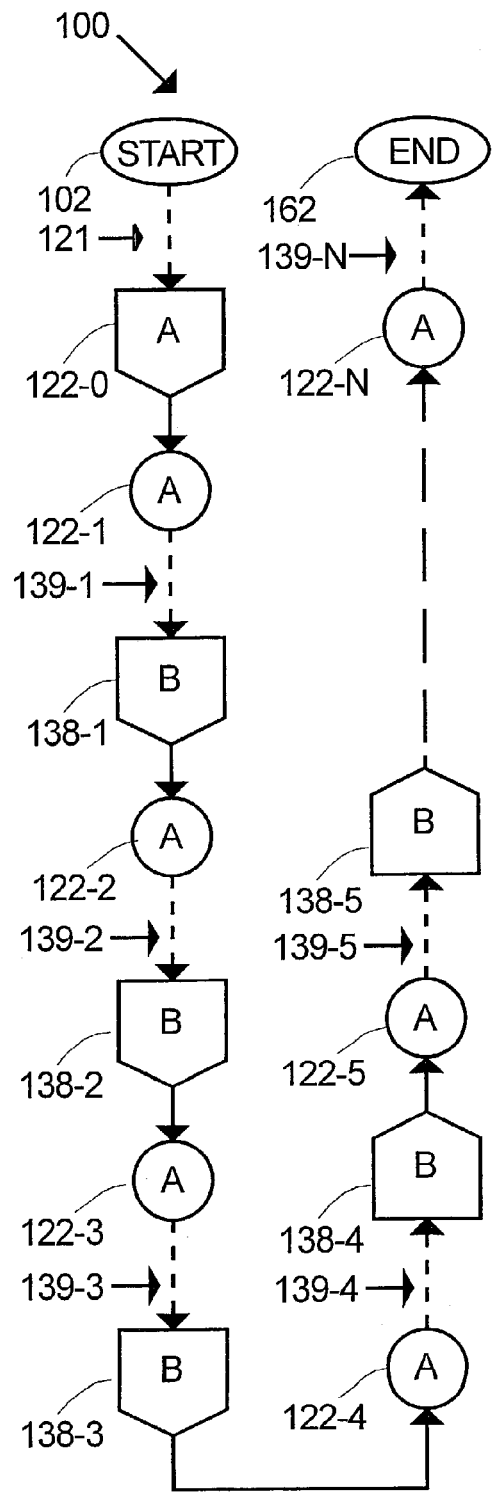
FIG. 4 is a simplified flow chart of a decluttering method of the present invention according to a first embodiment.

FIG. 4 is a simplified flow chart of method 100 of the present invention for providing adaptive decluttering based on the total number $S_T$ of symbols available in the current map area. The total number $S_T$ of symbols is to be divided into the number $S_D$ about which information is displayed on the map (e.g., symbols 14) and the number $S_I$ which are to be ignored or whose presence may be merely indicated by for example one or more dots (e.g., dots 20), but about which no information is provided on screen 22. Method 100 takes into account which of the various types of symbols that the user (e.g., the aircraft pilot or navigator) has selected to be displayed. For convenience of explanation, it will be assumed that the user has selected VOR, NDB, ILS, and APT symbols to be presented on the electronic map display. Obviously, fewer or more symbols could be presented according to their availability within the map area and the desires of the user.

FIG. 4 illustrates a first embodiment of the method of the present invention wherein the total available symbol count $S_T$ is determined for the symbol types that have been selected by the user and then $S_T$ is used to declutter the display. FIG. 4 is a global overview of the method of the present invention using the total available symbol count $S_T$. Beginning at START 102, process 100 first executes sub-process 121 described in FIG. 5 and then executes sequentially sub-processes 139-$i$, e.g., 139-1, 139-2, 139-3 . . . 139-N, where N is the total number of map symbol types (e.g., VOR, NDB, ILS, APT, etc.) desired to be displayed. Sub-process 139-$i$ is described in FIG. 6. When the last occurrence 139-N of sub-process 139-$i$ has run, method 100 terminates at END 162

Figure 5:
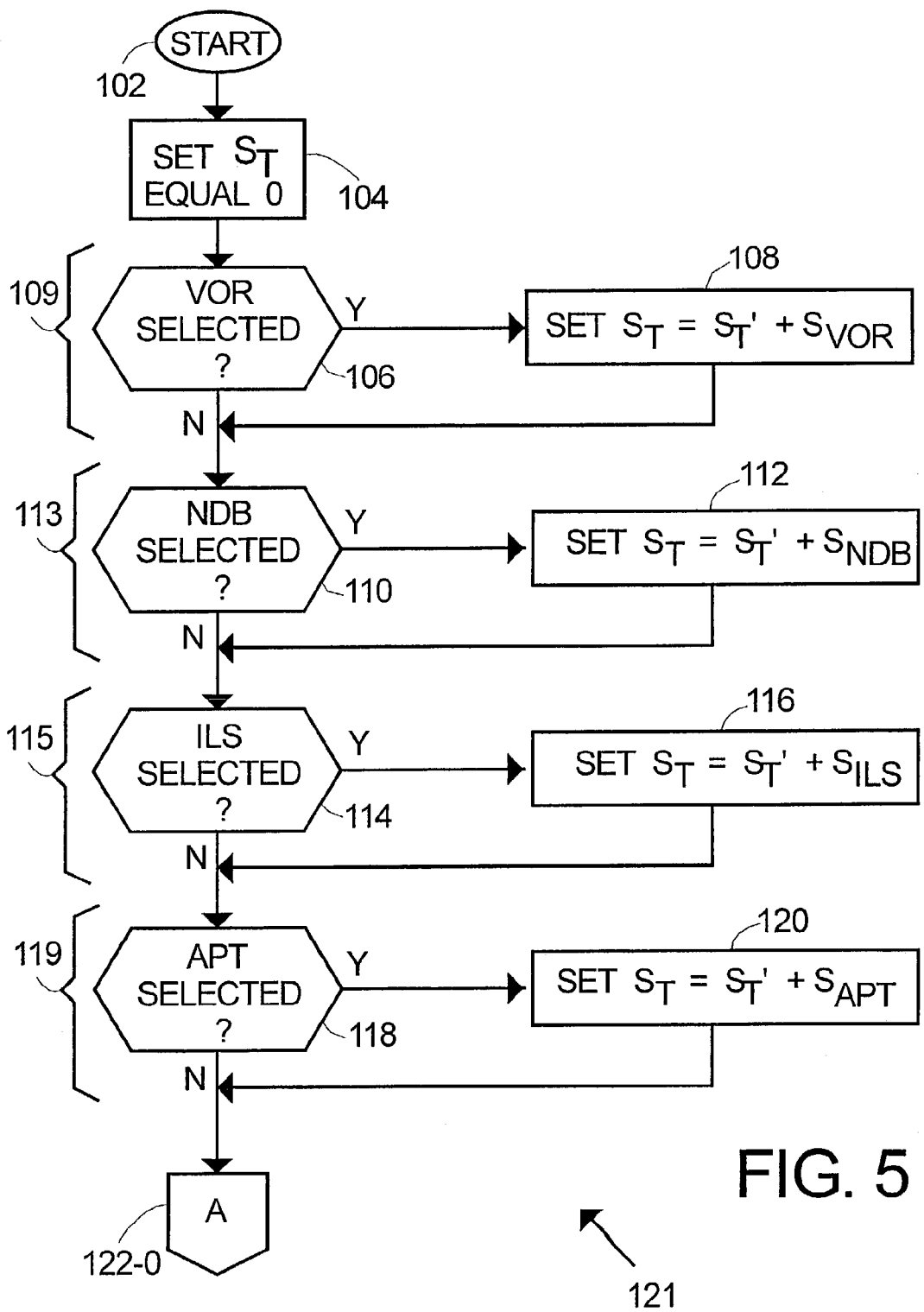
FIG. 5 is a simplified flow chart of a portion of the symbol decluttering method of FIG. 4 showing further details.

Referring now to FIG. 5, following START 102, in step 104 the symbol count $S_T$ is set to zero, i.e., $S_T=0$. In successive query steps 106, 110, 114, 118 it is determined whether a particular symbol type, e.g., VOR, NDB, ILS, APT, etc. has been selected by the user for inclusion in the total. For example, if the answer to VOR query step 104 is YES (TRUE), then in step 108 the number SVOR of VORs within the selected map range is added, that is, $S_T$ is set equal to $S_T'+$SVOR where $S_T'$ is the value of $S_T$ prior to step 108 (in this instance, $S_T'=0$), before proceeding to next query step 110. If the answer to query 104 is NO (FALSE) then the method proceeds directly to next query step 110 without altering $S_T$. This process is repeated using further query steps 110, 114, 118 and further conditional SET steps 112, 116, 120. Reference numbers 109, 113, 115 and 119 identifies these combinations of query and SET steps for each symbol type. Upon the completion of the last SET step (e.g., step combination 119) sub-process 121 proceeds to sub-process END step 122-0. Assuming that VOR, NDB, ILS, APT have all been selected by the user, then one obtains at END 122-0 the value $S_T=S_{VOR}+S_{NDB}+S_{ILS}+S_{APT}$, where $S_{VOR}$, $S_{NDB}$, $S_{ILS}$, $S_{APT}$ are the respective numbers of VOR, NDB, ILS and APT symbols available within the map area.

Those of skill in the art will understand based on the explanation herein that fewer or more symbol types can be used by decreasing or increasing the number of step combinations 109, 113, 115, 119 for additional symbol types that the user elects to include. The steps illustrated in FIG. 4 may be performed in any order. Sub-process 121 of FIG. 4 proceeds to FIG. 5 as indicated by block "A" at end 122-0 and start 122-1 where method 100 continues after $S_T$ has been determined.

Figure 6:
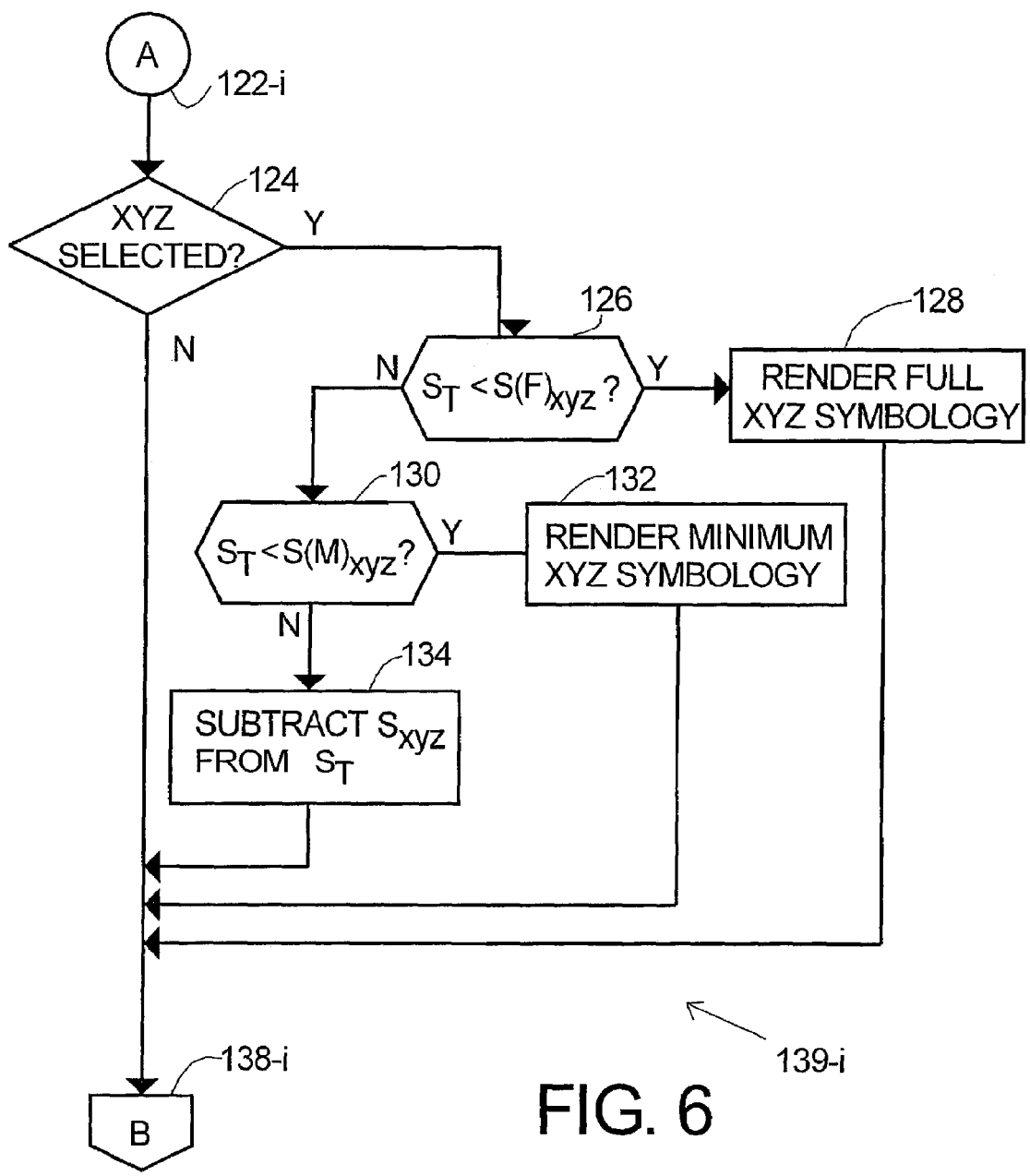
FIG. 6 is a simplified flow chart of a further portion of the symbol decluttering method of FIG. 4 showing still further details.

As shown in FIG. 4, sub-process 139 of FIG. 6 is run multiple times according to what symbols have been selected for possible display. In connection with FIG. 6 illustrating sub-process 139-$i$, the abbreviation XYZ is used to stand for whatever symbol type has been selected. The sub-process is the same. Referring now to FIG. 6, following sub-process start "A" at 122-$i$, query step 124 is provided in which it is determined if the XYZ option has been selected by the user, where XYZ represents one or the other of the symbol types available to the user. In this example, XYZ=VOR, NDB, ILS and/or APT. If the answer to query 124 is NO (FALSE) then sub-process 139-$i$ proceeds to sub-process end "B" at 138-$i$. If the answer to query 124 is YES (TRUE) then sub-process 139-$i$ proceeds to query 126 wherein it is determined whether $S_T<S(F)_{XYZ}$, where S(F) is the threshold above which less than full information for each XYZ symbol is rendered on the map display. If the answer to query 126 is YES (TRUE) then in step 128 the available $S_{XYZ}$ symbols have their full information displayed on the map screen, and the method proceeds to sub-process end 138-$i$ with the value of $S_T$ remaining unchanged.

If the answer to query 126 is NO (FALSE), then sub-process 139-$i$ proceeds to query 130 where it is determined whether $S_T<S(M)_{XYZ}$, where S(M) is the threshold above which minimum or no information for each XYZ symbol is rendered on the map display. If the outcome of query step 130 is YES (TRUE) then step 132 is performed wherein minimal XYZ information is rendered on the map display, e.g., nothing or just dots, and the method proceeds to sub-process end block 138-$i$ with the value of $S_T$ remaining unchanged. If the outcome of query 130 is NO (FALSE) then in step 134, $S_T$ is set equal to $S_T'-S_{XYZ}$, where $S_T'$ is the value of $S_T$ before query 130 and $S_{XYZ}$ is the number of available XYZ symbols. The new $S_T$ is transferred to sub-process end 138-$i$. For convenience, operations 122-$i$ to 138-$i$ are referred to collectively as sub-process steps 139-$i$. Since $S_T=$SUM$(S_{XYZ})$, $S_T$ should never be negative. However, a test for $S_T>0$ can be conveniently performed after each subtraction step, and if the outcome is NO (FALSE) the process ends, otherwise it proceeds. A test for $S_T>0$ has been omitted from the flow charts herein for simplicity. As shown in FIG. 4, steps 139-$i$ are successively repeated for each desired symbol, that is for XYZ=VOR, NDB, ILS, APT, etc., see for example, sub-processes 139-1, 139-2, 139-3, 139-4, etc., in FIG. 4.

Note that the number of symbols displayed for each symbol type depends on the thresholds $S(F)_{XYZ}$, $S(M)_{XYZ}$ for each symbol type, relative to the total available symbol count $S_T$. In general S(M) is greater than S(F). The clutter is controlled by the values of $S(F)_{XYZ}$, $S(M)_{XYZ}$ that are selected and stored in the system. The system designer or maintenance person ordinarily specifies these values. By way of example, assume that $S_{VOR}=30$, $S_{NDB}=30$, $S_{ILS}=30$ and $S_{APT}=30$. Then $S_T=120$. Assume also that $S(F)_{VOR}$, $S(M)_{VOR}=150, 180$; $S(F)_{NDB}$, $S(M)_{NDB}=140, 170$; $S(F)_{ILS}$, $S(M)_{ILS}=120, 160$; and $S(F)_{APT}$, $S(M)_{APT}=100, 130$. Then, the numbers of symbols that will be displayed, by type, with full information are $VOR_F=30$, $NDB_F=30$, $ILS_F=0$ and $APT_F=0$ and the numbers that will be rendered, by type, with minimal information (e.g., just dots) are $VOR_M=0$, $NDB_M=0$, $ILS_M=30$ and $APT_M=30$. The numbers displayed depend only on the range setting to the extent that for very small range settings the available symbols may total less than the display thresholds. Otherwise, the clutter level is approximately constant and of an amount controlled by the threshold settings.

Figure 7:
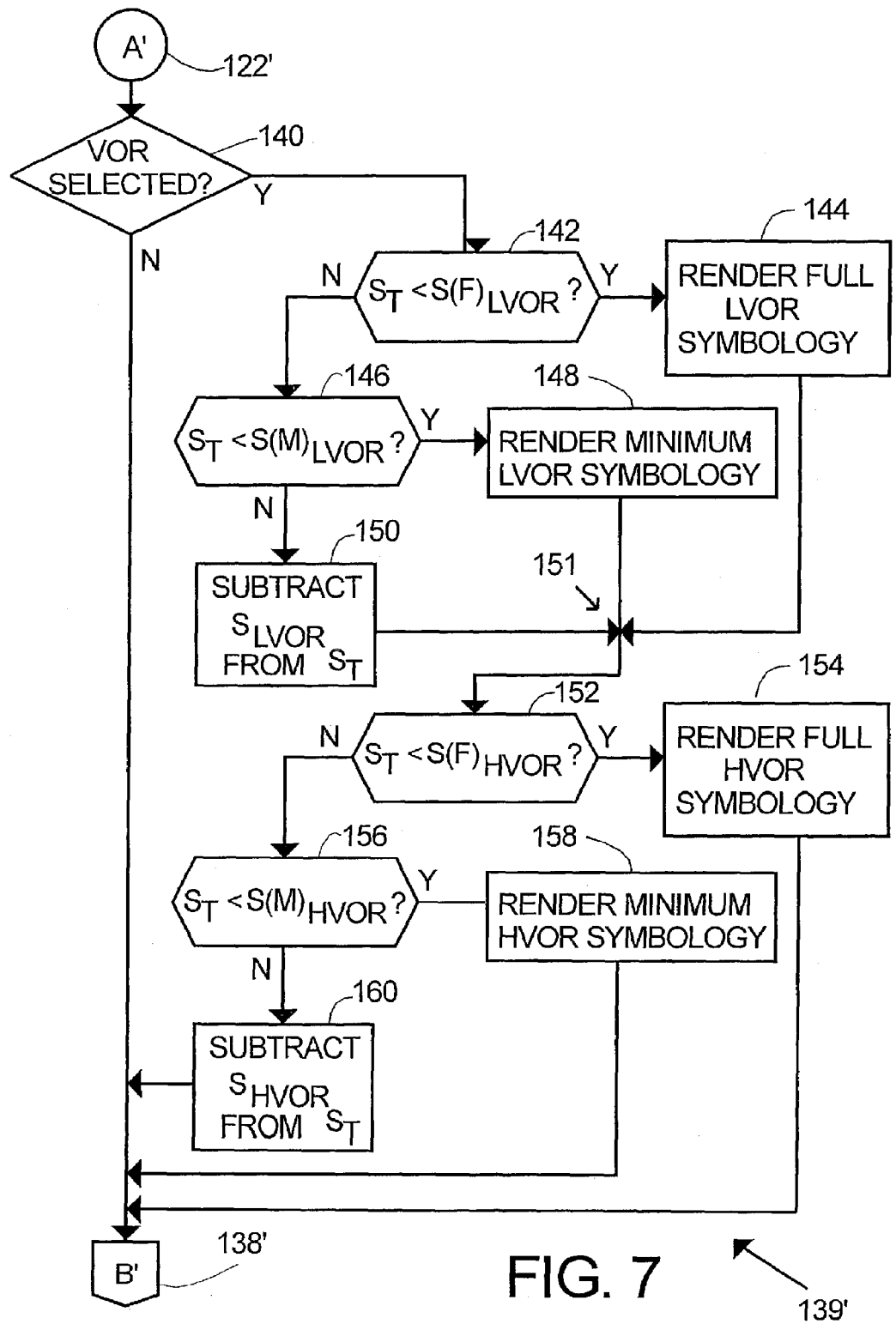
FIG. 7 is a simplified flow chart of a still further portion of the symbol decluttering method of FIG. 4 showing additional details.

As previously mentioned, VOR symbols may be present in two types, i.e., LVOR and HVOR. FIG. 7 illustrates sub-process 139' showing how sub-process 139' handles symbols that have two sub-types, e.g., VOR=LVOR, HVOR. Sub-process 139' of FIG. 7 can be inserted in place of any of sub-processes 139 in FIG. 4. While sub-process 139' of FIG. 7 is illustrated for VOR=LVOR, HVOR, persons of skill in the art will understand that sub-process 139' applies to any symbol type that has two or more kinds, in general expressed as WXYZ.

Sub-process 139' begins after sub-process start 122' with query step 140 in which it is determined whether the VOR option has been selected by the user. If the outcome of query step 140 is NO (FALSE) then the process goes directly to sub-process end step 138'. If sub-process 139' is the last sub-process, then sub-process end 138' is also END 162 of method 100, wherein the total symbols to be displayed are now known. If the outcome of query 140 is YES (TRUE) then in query step 142 it is determined whether $S_T<S(F)_{LVOR}$, where S(F) has the same general meaning as in connection with FIG. 6 but for LVOR symbols. If the outcome of query 142 is YES (TRUE) then in step 144 the available $S_{LVOR}$ symbols have their full information displayed on the map screen, and the method proceeds to 151 with the value of $S_T$ remaining unchanged. If the outcome of query 142 is NO (FALSE) then query 146 is performed to determine whether $S_T<S(M)_{LVOR}$ where S(M) has the same general meaning as in connection with FIG. 6 but for LVOR symbols. If the outcome of query 146 is YES (TRUE) then in step 148 minimal LVOR information is rendered on the map display, e.g., nothing or just dots, and the method proceeds to 151 with the value of $S_T$ remaining unchanged. If the outcome of query 146 is NO (FALSE), then step 150 is performed wherein $S_T$ is set equal to $S_T'-S_{LVOR}$, where $S_T'$ is the value of $S_T$ prior to query 146 and $S_{LVOR}$, is the number of available LVOR symbols. The new $S_T$ is transferred to 151 and the number of LVOR symbols to be displayed is determined.

The $S_T$ value arriving at 151 is fed to query 152 where it is determined whether $S_T<S(F)_{HVOR}$ is TRUE or FALSE, where S(F) has the same general meaning as in connection with FIG. 6 but for HVOR. If the outcome of query 152 is YES (TRUE) then in step 154 the available $S_{HVOR}$ symbols have their full information displayed on the map screen, and the method proceeds to sub-process end 138' with the value of $S_T$ remaining unchanged. If the outcome of query 152 is NO (FALSE) then query 156 is performed to determine whether $S_T<S(M)_{HVOR}$. If the outcome of query 156 is YES (TRUE) then in step 158 minimal HVOR information is rendered on the map display, e.g., nothing or just dots, and the method proceeds to sub-process end 138' with the value of $S_T$ remaining unchanged. If the outcome of query 156 is NO (FALSE), then step 150 is performed wherein $S_T$ is set equal to $S_T'-S_{HVOR}$, where $S_T'$ is the value of $S_T$ prior to query 156 and $S_{HVOR}$, is the number of available HVOR symbols. The new $S_T$ transferred to sub-process end 138' and the number of HVOR symbols to be displayed is known.

S(F) and S(M) have the same meanings as discussed in connection with FIG. 6. If sub-process step 138' is the last step in method 100 (see FIG. 4) then subtract or SET step 160 can be omitted.

FIGS. 5–7 have illustrated the sub-processes used in method 100 of FIG. 4 wherein the total symbol count is used for decluttering. The relative order in which sub-process steps 139-i, 139'-i for VOR, NDB, ISL, APT, etc., are performed determines which symbol types are given higher priority. For example, those symbol types for which steps 139-i (see FIG. 6) are performed last will be rendered, while those that are performed first may not be rendered. Thus, the system designer or the user may control the priority of symbol types displayed within the overall symbol count by selecting the sequence of evaluation of the different symbol types, with the most important symbols being evaluated later rather than sooner in the 139-i sequence for i=1 to i=N, shown in FIG. 4.

Figure 8:
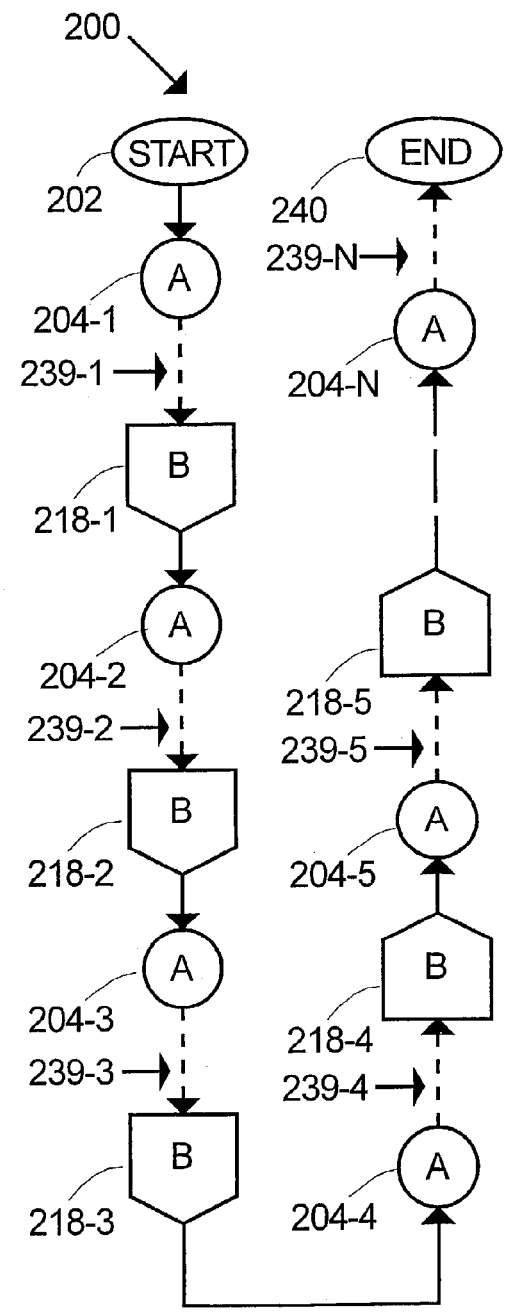
FIG. 8 is a simplified flow chart of a decluttering method of the present invention according to a second embodiment.
Figure 9:
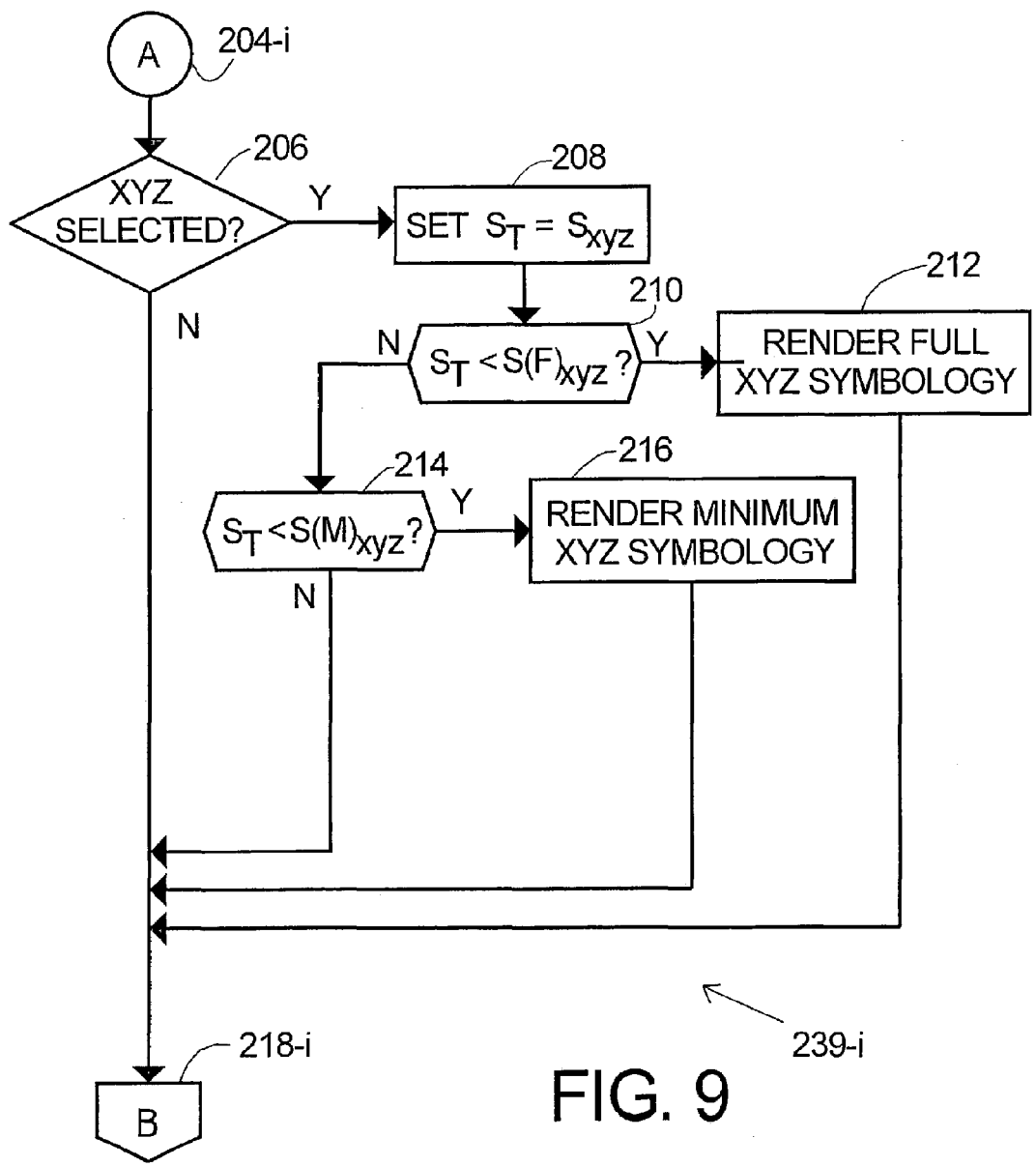
FIG. 9 is a simplified flow chart of a portion of the symbol decluttering method of FIG. 8 showing further details.
Figure 10:
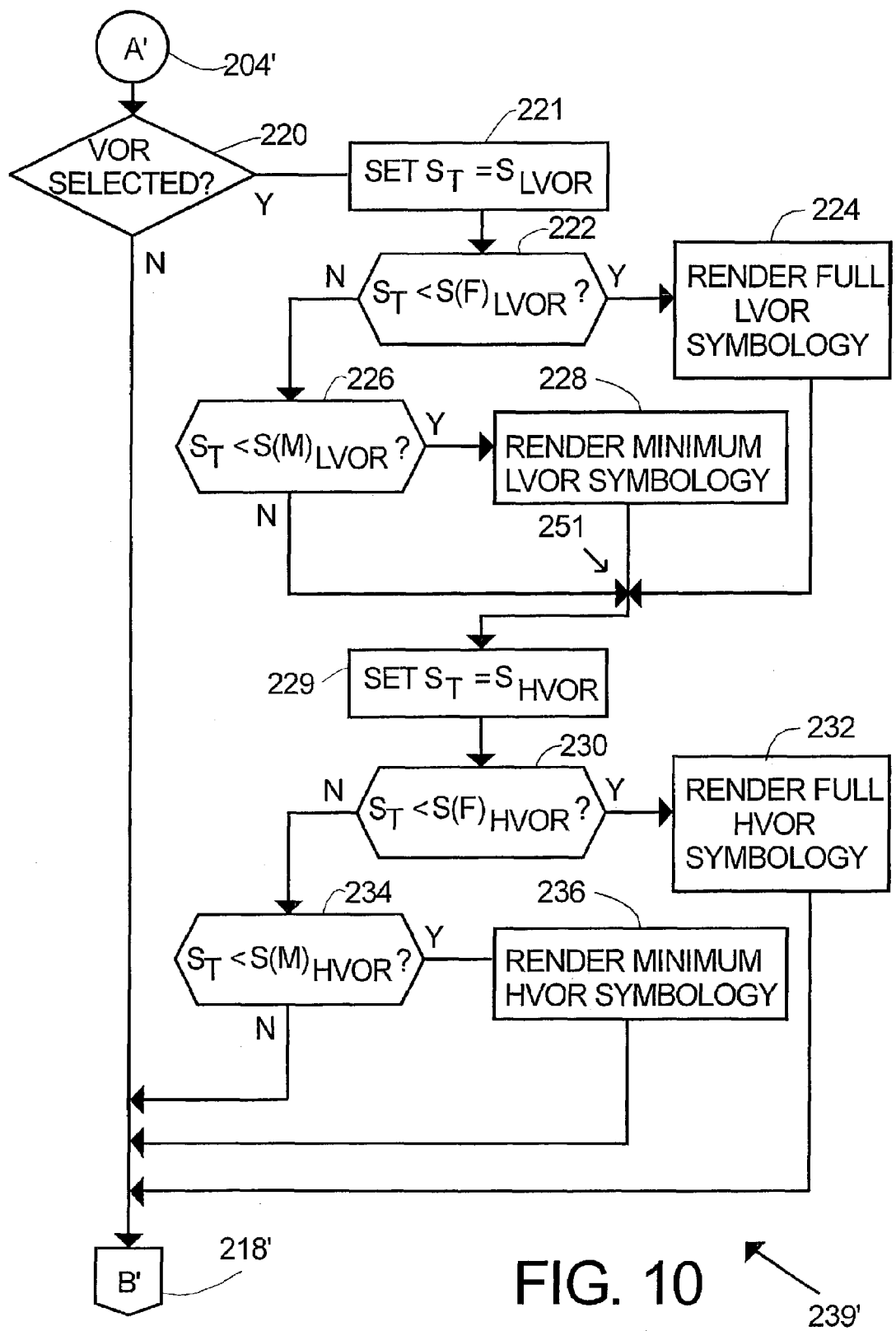
FIG. 10 is a simplified flow chart of a further portion of the symbol decluttering method of FIG. 8 showing still further details.

FIG. 8 is a simplified flow chart similar to FIG. 4, but of decluttering method 200 according to a second embodiment of the present invention. Method 200 carries out decluttering based on the number of symbols of each type rather than on the total number of symbols of all types. Following START 202, method 200 executes sub-processes 239-i (see FIG. 9) for i=1 to N, in a way analogous to sub-process 139-i in FIG. 4. Sub-processes 239-i correspond to each symbol type desired to be displayed. Sub-process 239-i, analogous to sub-process 139-i of FIG. 6, is shown in FIG. 9 and sub-process 239' analogous to sub-process 139' in FIG. 7 is shown in FIG. 10. When last sub-process 239-N (or 239'-N) is completed then method 200 is complete at END 240 where the symbols of each type to be presented FULL or MINIMUM are known. The value of N depends upon the number of symbol types selected for display by the user and correspondingly fewer or more sub-processes 239-i are included in method 200 as required.

FIG. 9 is a simplified flow chart of sub-process 239-i of the symbol decluttering method 200 of FIG. 8 showing further details. Following sub-process start "A" at 204-i, query 206 is executed. As explained in connection with FIG. 6, the letters XYZ represent a particular symbol desired to be included, e.g., VOR, NDB, ISL, APT, etc. Query 206 determines whether a particular symbol type has been selected by the user for inclusion in the map display. If the answer to query 206 is NO (FALSE) then sub-process 239-i proceeds to end "B" at 218-i. If the answer to query 206 is YES (TRUE) then sub-process 239-i proceeds block 208 wherein $S_T$ is set equal to $S_{XYZ}$, where $S_{XYZ}$ is the number of symbols of type XYZ.

Sub-process 239-i then proceeds to query 210 wherein it is determined whether $S_T<S(F)_{XYZ}$, where S(F) is the threshold above which less than full information for each XYZ symbol is rendered on the map display. If the answer to query 126 is YES (TRUE) then in step 212 the available $S_{xyz}$ symbols have their full information displayed on the map screen, and the method proceeds to sub-process end 218-i.

If the answer to query 210 is NO (FALSE), then sub-process method 239-i proceeds to query 214 where it is determined whether $S_T<S(M)_{XYZ}$, where S(M) is the threshold above which minimum or no information for each XYZ symbol is rendered on the map display. If the outcome of query 214 is YES (TRUE) then step 216 is performed wherein minimal XYZ information is rendered on the map display, e.g., nothing or just dots, and the method proceeds to sub-process end 238-i. If the outcome of query 214 is NO (FALSE) then sub-process 239-i proceeds to sub-process end 218-*i*. As shown in FIG. 8, steps 239-*i* are successively repeated for each desired symbol, that is for XYZ=VOR, NDB, ILS, APT, etc., see for example, sub-processes 239-1, 239-2, 239-3, 239-4, etc., in FIG. 8.

Note that the number of symbols displayed for each symbol type depends on the thresholds $S(F)_{XYZ}$, $S(M)_{XYZ}$ for each symbol type rather than the total available symbol count $S_T$=SUM ($S_{XYZ}$). The clutter is controlled by the values of $S(F)_{XYZ}$, $S(M)_{XYZ}$ that are selected and stored in the system. The system designer or maintenance person ordinarily specifies these values. For example, assume that $S_{VOR}$=30, $S_{NDB}$=30, $S_{ILS}$=60 and $S_{APT}$= 30. Assume also that $S(F)_{VOR}$, $S(M)_{VOR}$=80, 100; $S(F)_{NDB}$, $S(M)_{NDB}$=28, 100; $S(F)_{ILS}$, $S(M)_{ILS}$=61, 70; and $S(F)_{APT}$, $S(M)_{APT}$=32, 50. Then, the numbers of symbols that will be displayed, by type, with full information are $VOR_F$=30, $NDB_F$=0, $ILS_F$=60 and $APT_F$ =30 and the numbers that will be rendered, by type, with minimal information (e.g., just dots) are $VOR_M$=0, $NDB_M$=30, $ILS_M$=0 and $APT_M$=0. The number of symbols displayed depends only on the range setting to the extent that the range setting determines the number of symbols available within the map area. For very small range settings the available number of symbols may total less than the display thresholds. Otherwise, the clutter level is approximately constant and of an amount controlled by the threshold settings.

FIG. 10 is a simplified flow chart analogous to FIG. 7 of a further portion of the symbol decluttering method of FIG. 8 showing still further details. As previously mentioned, VOR symbols may be present in two types, i.e., LVOR and HVOR. FIG. 10 illustrates sub-process 239' showing how process 200 handles symbols that have two sub-types, e.g., VOR=LVOR, HVOR, referred to generally as WXYZ. Sub-process 239' of FIG. 10 can be inserted in place of any of sub-processes 239-*i* in FIG. 8. While sub-process 239' of FIG. 10 is illustrated for VOR=LVOR, HVOR, persons of skill in the art will understand that sub-process 239' applies to any symbol type WXYZ, e.g., W1XYZ and W2XYZ.

Sub-process 239' begins after sub-process start 204' with query step 220 in which it is determined whether, for example, the VOR option has been selected by the user. If the outcome of query step 220 is NO (FALSE) then the process goes directly to sub-process end step 218'. If sub-process 239' is the last sub-process, then sub-process end 218' is also END 240 of method 200, wherein the number of symbols of each type to be displayed are now known.

If the outcome of query 220 is YES (TRUE) then method 239' proceeds to block 221 wherein $S_T$ is set equal to $S_{LVOR}$, where $S_{LVOR}$ is the number of symbols of that type. Then in query step 222 it is determined whether $S_T<S(F)_{LVOR}$, where S(F) has the same meaning as in connection with FIG. 7. If the outcome of query 222 is YES (TRUE) then in step 224 the available $S_{LVOR}$ symbols have their full information displayed on the map screen, and the method proceeds to 251. If the outcome of query 222 is NO (FALSE) then query 226 is performed to determine whether $S_T<S(M)_{LVOR}$ where S(M) has the same meaning as in connection with FIG. 7. If the outcome of query 226 is YES (TRUE) then in step 228 minimal LVOR information is rendered on the map display, e.g., nothing or just dots, and the method proceeds to 251. If the outcome of query 226 is NO (FALSE), then sub-process 239' proceeds to 251.

The outcome arriving at 251 is fed to block 229 wherein $S_T$ is set equal to $S_{HVOR}$, where $S_{HVOR}$ is the number of symbols of that type. The result is fed to query 230 where it is determined whether $S_T<S(F)_{HVOR}$ is TRUE or FALSE, where S(F) has the same meaning as in connection with FIG. 6. If the outcome of query 230 is YES (TRUE) then in step 232 the available $S_{HVOR}$ symbols have their full information displayed on the map screen, and the method proceeds to sub-process end 218'. If the outcome of query 230 is NO (FALSE) then query 234 is performed to determine whether $S_T<S(M)_{HVOR}$. If the outcome of query 234 is YES (TRUE) then in step 236 minimal HVOR information is rendered on the map display, e.g., nothing or just dots, and the method proceeds to sub-process end 218'. If the outcome of query 234 is NO (FALSE), then method 239' proceeds to sub-process end 218'. FIGS. 8–10 have illustrated the sub-processes used in method 200 of FIG. 8 wherein the symbol count of each type is used for decluttering.

Figure 11:
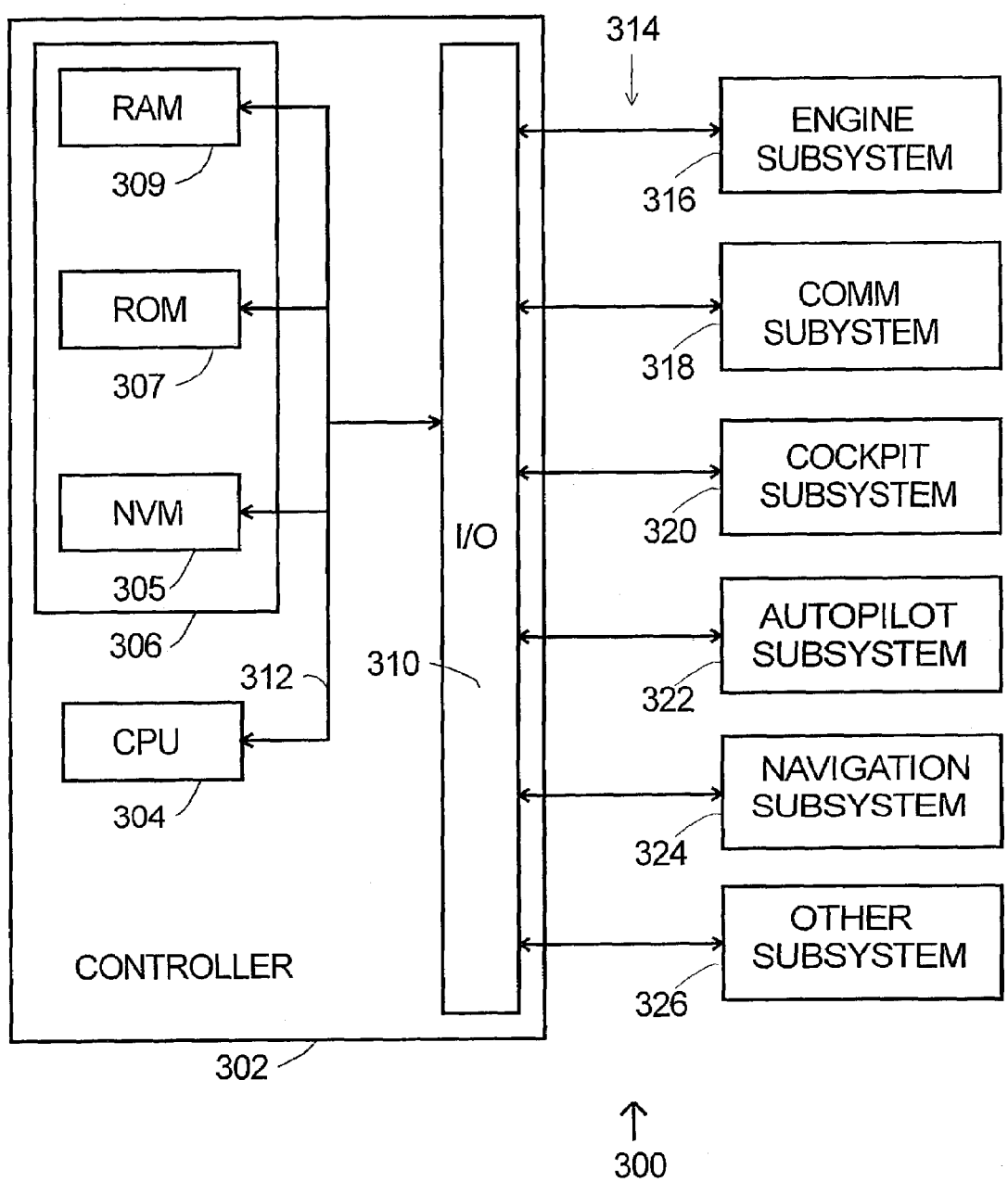
FIG. 11 is a simplified schematic diagram of a flight management system according to the present invention.

FIG. 11 is a simplified schematic diagram of Flight Management System (FMS) 300 for carrying out the method of FIGS. 4 and 8. As used herein, the words "Flight Management System" and the abbreviation "FMS" are intended to include any kind of electronic system for generating map displays with overlaid symbols, whether mobile or static and not be limited merely to systems suitable for aircraft or other types of vehicles.

FMS 300 comprises controller 302 having central processing unit (CPU) 304 and memory 306. Memory 306 usefully includes Non-volatile memory (NVM) 305, read only memory (ROM) 307 and random access or other temporary memory (RAM) 309. CPU 304 and memory 306 are coupled to input-output (I/O) 310 that communicates with various subsystems via buses 314. Typical subsystems suitable for a vehicle are engine management subsystem 316, communication subsystem 318, cockpit subsystem 320, autopilot subsystem 322 and navigation subsystem 324. Cockpit subsystem 320 includes the displays, as for example, the map display on which the various symbols described above are rendered. Cockpit subsystem 320 also includes a control panel via which the pilot or navigator may select the symbols desired to be shown and the order in which they are to be evaluated for decluttering. The threshold constants $S_T<S(F)_{XYZ}$, $S_T<S(M)_{XYZ}$ and other constants are conveniently stored in memory 306 so that they are available when required by programs executing processes 100, 200. Fewer or additional subsystems may be present depending upon the type of vehicle or whether the display is static and not vehicle mounted.

Computer programs for processes 100 and 200 (see FIGS. 4, 8) usefully reside in memory 206 along with threshold constants $S_T<S(F)_{XYZ}$, $S_T<S(M)_{XYZ}$, other constants and other information of interest. As FMS 300 carries out the steps of processes 100, 200 it uses threshold and map information from memory 206 and crew inputs from cockpit subsystem 320 and navigational information from subsystem 324 (e.g., aircraft position information relative to the electronic map). Examples of crew inputs are: selecting the symbols to be displayed, the order of evaluation of the different symbol types, and the type of decluttering desired, as for example, the total symbol count type illustrated in FIG. 4 or the individual symbol count type illustrated in FIG. 8. The FMS (or equivalent system) displays the results on the map screen of cockpit subsystem 220, or such other display as may be used. Any convenient display coupled to FMS 300 can be used to render the map, the aircraft current position and the desired symbols. In a static display, positions of several vehicles may be provided.

While several exemplary embodiments have been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for controlling the number of symbols of types $(XYZ)_i$ rendered on a map display, where i runs from 1 to N and N is the total number of selected symbol types, comprising:
  a) determining the total number of symbols $S_T=\mathrm{SUM}\{S_{(XYZ)i}\}$ for i=1 to N, where $\{S_{(XYZ)i}\}$ is the number of symbols of type $(XYZ)_i$, and subsequently initializing i=1 and $S_T'=S_T$;
  b) rendering FULL information for symbol type $(XYZ)_i$ on the map display and delivering $S_T=S_T'$ to step (e) if $S_T<S_i(F)_{XYZ}$ is TRUE, where $S_i(F)_{XYZ}$ is a first threshold constant for symbol type $(XYZ)_i$;
  c) rendering MINIMUM information for symbol type $(XYZ)_i$ on the map display and delivering $S_T=S_T'$ to step (e) if $S_T<S_i(F)_{XYZ}$ is FALSE and if $S_T<S_i(M)_{XYZ}$ is TRUE, where $S_i(M)_{XYZ}$ is a second threshold constant for symbol type $(XYZ)_i$;
  d) delivering $S_T=S_T'-S_{i(XYZ)i}$ to step (e) if $S_T<S_i(F)_{XYZ}$ is FALSE and if $S_T<S_i(M)_{XYZ}$ is FALSE, where $S_{i(XYZ)i}$ is the number of available symbols of type $(XYZ)_i$; and
  e) repeating steps (b)–(d) for i=2 to N and initializing $S_T'=S_T$, thereby populating the map display with a controlled number of symbols.

2. The method of claim 1 wherein $S_i(M)_{XYZ}<S_i(F)_{XYZ}$.

3. The method of claim 1 further comprising, prior to step (a), the step of determining whether symbol type $(XYZ)_i$ available in stored map data has been selected as a user selected symbol and if selected using the selected symbols in steps (a)–(d) and if not selected proceeding to step (e) without performing steps (a)–(d) for that symbol type.

4. The method of claim 1 wherein symbol type $(XYZ)_j$ for 1<j<N comprises at least two symbol sub-types 1PQR and 2PQR, wherein for symbol type $(XYZ)_j$ steps (b)–(d) are first performed for symbol sub-type 1PQR using threshold values $S_i(F)_{XYZ}=S_j(F)_{1PQR}$ and $S_i(M)_{XYZ}=S_j(M)_{1PQR}$ and steps (b)–(d) are then performed for symbol sub-type 2PQR using threshold values $S_i(F)_{XYZ}=S_j(F)_{2PQR}$ and $S_i(M)_{XYZ}=S_j(M)_{2PQR}$ using the $S_T$ value resulting from steps (b)–(d) for symbol sub-type 1PQR.

5. A method for controlling the number of symbols of types $(XYZ)_i$ rendered on a map display, where i runs from 1 to N and N is the total number of selected symbol types, comprising, starting first with i=1:
  a) setting $S_{Ti}=S_{(XYZ)i}$, where $S_{(XYZ)i}$ is the number of available symbols of type $(XYZ)_i$;
  b) rendering FULL information for symbol type $(XYZ)_i$ on the map display if $S_{Ti}<S_i(F)_{XYZ}$ is TRUE, where $S_i(F)_{XYZ}$ is a first threshold constant for symbol type $(XYZ)_i$;
  c) rendering MINIMUM information for symbol type $(XYZ)_i$ on the map display if $S_{Ti}<S_i(F)_{XYZ}$ is FALSE and if $S_{Ti}<S_i(M)_{XYZ}$ is TRUE, where $S_i(M)_{XYZ}$ is a second threshold constant for symbol type $(XYZ)_i$, or if $S_{Ti}<S_i(F)_{XYZ}$ is FALSE and if $S_{Ti}<S_i(M)_{XYZ}$ is FALSE rendering none of symbols of type $(XYZ)_i$ on the map display; and
  d) repeating steps (a)–(c) for i=2 to N, thereby populating the map display with a controlled number of symbols.

6. The method of claim 5 wherein $S_i(M)_{XYZ}>S_i(F)_{XYZ}$.

7. The method of claim 5 further comprising prior to step (a), the step of determining which of $(XYZ)_i$ has been selected as a user selected symbol and using the selected symbols in steps (a)–(d) for that symbol type.

8. The method of claim 5 wherein symbol type $(XYZ)_j$ for 1<j<N comprises at least two symbol sub-types 1PQR and 2PQR wherein for symbol type $(XYZ)_i$ steps (a)–(c) are first performed for symbol sub-type 1PQR using threshold values $S_i(F)_{XYZ}=S_j(F)_{1PQR}$ and $S_i(M)_{XYZ}=S_j(M)_{1PQR}$ and then steps (a)–(c) are performed for symbol sub-type 2PQR using threshold values $S_i(F)_{XYZ}=S_j(F)_{2PQR}$ and $S_i(M)_{XYZ}=S_j(M)_{2PQR}$.

9. An apparatus controlling in part the operation of a map display on which various symbols are to be rendered in controlled number, comprising:
  a) a processor;
  b) a memory coupled to the processor;
  c) a display unit coupled to the processor and memory for displaying the map, the aircraft location on the map and the various symbols; and
  d) a program residing in memory and being executed by the processor for rendering on the map display a controlled number of the symbols, the program comprising:
    (1) determining the total number of symbols $S_T=\mathrm{SUM}\{S_{(XYZ)i}\}$ for i=1 to N, where $\{S_{(XYZ)i}\}$ is the number of selected symbols of type $(XYZ)_i$, and subsequently initializing i=1 and $S_T'=S_T$;
    (2) rendering FULL information for symbol type $(XYZ)_i$ on the map display and delivering $S_T=S_T'$ to step (5) if $S_T<S_i(F)_{XYZ}$ is TRUE, where $S_i(F)_{XYZ}$ is a first threshold constant for symbol type $(XYZ)_i$;
    (3) rendering MINIMUM information for symbol type $(XYZ)_i$ on the map display and delivering $S_T=S_T'$ to step (5) if $S_T<S_i(F)_{XYZ}$ is FALSE and if $S_T<S_i(M)_{XYZ}$ is TRUE, where $S_i(M)_{XYZ}$ is a second threshold constant for symbol type $(XYZ)_i$;
    (4) delivering $S_T=S_T'-S_{i(XYZ)i}$ to step (5) if $S_T<S_i(F)_{XYZ}$ is FALSE and if $S_T<S_i(M)_{XYZ}$ is FALSE, where $S_{i(XYZ)i}$ is the number of available symbols of type $(XYZ)_i$; and
    (5) repeating steps (2)–(4) for i=2 to N and initializing $S_T'=S_T$, thereby populating the map display with a controlled number of symbols.

10. The apparatus of claim 9 wherein $S_i(M)_{XYZ}>S_i(F)_{XYZ}$.

11. The apparatus of claim 9 wherein the program residing in memory further comprises prior to step (1), the step of determining whether symbol type $(XYZ)_i$ available in stored map data has been selected as a user selected symbol and if selected using the selected symbols in steps (1)–(4) and if not selected proceeding to step (5) without performing steps (1)–(4).

12. The apparatus of claim 9 wherein in the program residing in memory symbol type $(XYZ)_j$ for 1<j<N comprises at least two symbol sub-types 1PQR and 2PQR, wherein steps (2)–(4) are first performed for symbol sub-type 1PQR using threshold values $S_i(F)_{XYZ}=S_j(F)_{1PQR}$ and $S_i(M)_{XYZ}=S_j(M)_{1PQR}$ and steps (2)–(4) are then performed for symbol sub-type 2PQR using threshold values $S_i(F)_{XYZ}=S_j(F)_{2PQR}$ baand $S_i(M)_{XYZ}=S_j(M)_{2PQR}$ using the $S_T$ value resulting from steps (2)–(4)) for symbol sub-type 1PQR.

13. The apparatus of claim 9 further comprising a second program residing in memory comprises, starting first with i=1:
  (A) setting $S_{Ti}=S_{(XYZ)i}$, where $S_{(XYZ)i}$ is the number of available symbols of type $(XYZ)_i$;
  (B) rendering FULL information for symbol type $(XYZ)_i$ on the map display if $S_{Ti}<S_i(F)_{XYZ}$ is TRUE, where $S_i(F)_{XYZ}$ is a first threshold constant for symbol type $(XYZ)_i$;
  (C) rendering MINIMUM information for symbol type $(XYZ)_i$ on the map display if $S_{Ti}<S_i(F)_{XYZ}$ is FALSE and if $S_{Ti}21\ S_i(M)_{XYZ}$ is TRUE, where $S_i(M)_{XYZ}$ is a second threshold constant for symbol type $(XYZ)_i$, or if $S_{Ti}<S_i(F)_{XYZ}$ is FALSE and if $S_{Ti}<S_i(M)_{XYZ}$ is FALSE rendering none of symbols of type $(XYZ)_i$, on the map display; and
  (D) repeating steps (A)–(C) for i=2 to N, thereby populating the map display with a controlled number of symbols.

14. The apparatus of claim 13 wherein $S_i(M)_{XYZ}>S_i(F)_{XYZ}$.

15. The apparatus of claim 13 wherein the program residing in memory further comprises prior to step (1), the step of determining whether symbol type $(XYZ)_i$ available in stored map data has been selected as a user selected symbol and if selected using the selected symbols in steps (1)–(3) and if not selected proceeding to step (4) without performing steps (1)–(4).

16. The apparatus of claim 13 wherein symbol type $(XYZ)_j$ comprises at least two symbol sub-types 1PQR and 2PQR, wherein steps (1)–(3) are first performed for symbol sub-type 1PQR using threshold values $S_i(F)_{XYZ}=S_j(F)_{1PQR}$ and $S_i(F)_{XYZ}=S_j(M)_{1PQR}$ and then steps (1)–(3) are performed again for symbol sub-type 2PQR using threshold values $S_i(F)_{XYZ}=S_j(F)_{2PQR}$ and $S_i(F)_{XYZ}=S_j(M)_{2PQR}$.

17. A program product comprising:
  (1) a program for controlling the number of symbols of types $(XYZ)_i$ rendered on a map display, where i runs from 1 to N and N is the total number of selected symbol types, comprising, starting first with i=1 by:
    (a) determining the total number of symbols $S_T=SUM\{S_{(XYZ)i}\}$ for i=1 to N, where $\{S_{(XYZ)i}\}$ is the number of symbols of type $(XYZ)_i$, and initializing $S_T'=S_T$;
    (b) rendering FULL information for symbol type $(XYZ)_i$ on the map display and delivering $S_T=S_T'$ to step (e) if $S_T<S_i(F)_{XYZ}$ is TRUE, where $S_i(F)_{XYZ}$ is a first threshold constant for symbol type $(XYZ)_i$;
    (c) rendering MINIMUM information for symbol type $(XYZ)_i$ on the map display and delivering $S_T=S_T'$ to step (e) if $S_T<S_i(F)_{XYZ}$ is FALSE and if $S_T<S_i(M)_{XYZ}$ is TRUE, where $S_i(M)_{XYZ}$ is a second threshold constant for symbol type $(XYZ)_i$;
    (d) delivering $S_T=S_T'-S_{i(XYZ)i}$ to step (e), if $S_T<S_i(F)_{XYZ}$ is FALSE and if $S_T<S_i(M)_{XYZ}$ is FALSE; where $S_{i(XYZ)i}$ is the number of available symbols of type $(XYZ)_i$;
    (e) repeating steps (b)–(d) for i=2 to N and subsequently initializing $S_T'=S_T$, thereby populating the map display with a controlled number of symbols; and
  (2) signal bearing media bearing said program.

18. The program product of claim 17 wherein $S_i(M)_{XYZ}<S_i(F)_{XYZ}$.

19. The program product of claim 17 further comprising prior to step (a), the step of determining whether symbol type $(XYZ)_i$ available in stored map data has been selected as a user selected symbol and if selected using the selected symbol in steps (a)–(c) and if not selected proceeding to step (d) without performing steps (a)–(c).

20. The program product of claim 17 further comprising a second program starting first with i=1:
  A) setting $S_{Ti}=S_{(XYZ)i}$, where $S_{(XYZ)}$ is the number of available symbols of type $(XYZ)_i$;
  B) rendering FULL information for symbol type $(XYZ)_i$ on the map display if $S_{Ti}<S_i(F)_{XYZ}$ is TRUE, where $S_i(F)_{XYZ}$ is a first threshold constant for symbol type $(XYZ)_i$;
  C) rendering MINIMUM information for symbol type $(XYZ)_i$ on the map display if $S_{Ti}<S_i(F)_{XYZ}$ is FALSE and if $S_{Ti}<S_i(M)_{XYZ}$ is TRUE, where $S_i(M)_{XYZ}$ is a second threshold constant for symbol type $(XYZ)_i$, or if $S_{Ti}<S_i(F)_{XYZ}$ is FALSE and if $S_{Ti}<S_i(M)_{XYZ}$ is FALSE rendering none of symbols of type $(XYZ)_i$ on the map display; and
  D) repeating steps (A)–(C) for i=2 to N, thereby populating the map display with a controlled number of symbols.

* * * * *

UNITED STATES PATENT AND TRADEMARK OFFICE
CERTIFICATE OF CORRECTION

PATENT NO. : 6,973,386 B2 Page 1 of 1
APPLICATION NO. : 10/325185
DATED : December 6, 2005
INVENTOR(S) : Michael J. Gibbs It is certified that error appears in the above-identified patent and that said Letters Patent is hereby corrected as shown below:

In column 12, line 9, delete "$1<i<N$" and insert --$1<j<N$--

In column 12, line 66, delete "band"
In column 12, line 44, insert --and--

In column 13, line 12, following "STi", delete "21"
In column 13, line 12, following "STi", insert --<--

In column 14, line 19, following "Si(M)XYZ", delete "<"
In column 14, line 19, following "Si(M)XYZ", insert -->--

Signed and Sealed this

Twenty-seventh Day of March, 2007

JON W. DUDAS
*Director of the United States Patent and Trademark Office*